United States Patent
Haymond

(10) Patent No.: US 10,218,828 B2
(45) Date of Patent: Feb. 26, 2019

(54) ATTACHABLE SUPPLEMENTAL BATTERY FOR MOBILE DEVICE

(71) Applicant: Handstands Promo, LLC., Alpine, UT (US)

(72) Inventor: Bryce Haymond, West Valley, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 0 days.

(21) Appl. No.: 15/601,329

(22) Filed: May 22, 2017

(65) Prior Publication Data

US 2017/0339260 A1    Nov. 23, 2017

Related U.S. Application Data

(60) Provisional application No. 62/340,088, filed on May 23, 2016.

(51) Int. Cl.
| | | |
|---|---|---|
| *H04M 1/00* | (2006.01) | |
| *H04M 1/02* | (2006.01) | |
| *H01M 2/02* | (2006.01) | |
| *G06F 1/16* | (2006.01) | |
| *H02J 7/00* | (2006.01) | |

(Continued)

(52) U.S. Cl.
CPC ........ *H04M 1/0262* (2013.01); *G06F 1/1626* (2013.01); *G06F 1/1632* (2013.01); *G06F 1/1635* (2013.01); *H01M 2/0202* (2013.01); *H02J 7/0027* (2013.01); *H02J 7/0044* (2013.01); *H02J 7/0054* (2013.01); *G06F 2200/1633* (2013.01); *H01M 2/1022* (2013.01); *H02J 2007/0062* (2013.01); *H04M 1/0254* (2013.01); *H04M 1/185* (2013.01)

(58) Field of Classification Search
CPC .... H04B 1/3888; H04M 1/21; H04M 1/0202; H04M 1/0254; H04M 1/05; H04M 1/72527
USPC ...................................... 455/575.8
See application file for complete search history.

(56) References Cited

U.S. PATENT DOCUMENTS

| | | | | |
|---|---|---|---|---|
| 2012/0302297 A1* | 11/2012 | Patel | .................. | H04M 1/0283 455/575.4 |
| 2015/0194833 A1* | 7/2015 | Fathollahi | ............. | H02J 7/0044 320/114 |
| 2015/0272303 A1* | 10/2015 | Brown | .................. | G06F 1/1656 224/191 |

OTHER PUBLICATIONS

FRESHeTECH, "iMergency—Stick-On Rechargeable Battery Pack for Smartphones," http://www.freshetech.com/products/imergency-stick-on-rechargeable-battery-pack-for-smartphones_.As. 3 pgs. Accessed Mar. 21, 2016.

(Continued)

*Primary Examiner* — Tu X Nguyen
(74) *Attorney, Agent, or Firm* — Thorpe, North & Western, LLP

(57) ABSTRACT

A self-attaching supplemental battery for a cellular phone comprises a housing containing a rechargeable battery. A releasable attachment pad is affixed to an attachment side of the housing to releasably couple the housing and the rechargeable battery to a back of the cellular phone. A cover is removably carried by the housing, and selectively locatable on either side. The cover comprises a panel sized and shaped to cover the releasable attachment pad in a protection location when located on the attachment side of the housing, and to expose the releasable attachment pad in a storage location when located on the face side of the housing.

19 Claims, 5 Drawing Sheets

(51) Int. Cl.
    *H01M 2/10*     (2006.01)
    *H04M 1/18*     (2006.01)

(56) References Cited

OTHER PUBLICATIONS

Gadgetsin, "PowerSkin PoP'n Backup Battery," http://gadgetsin.com/powerskin-popn-backup-battery.htm. 5 pgs. Accessed Mar. 21, 2016.
Amazon, "PowerSKin Pop'n 2 Attachable Battery Pack for iPhone 6/6 Plus/5s/5c/5." http://www.amazon.com/PowerSkin-PopN-Attachable-Battery-iPhone/dp/B00OGAKH8A. 6 pgs. Accessed Mar. 21, 2016.
Amazon, "Philips DLP2272 Attachable Battery Pack Compatible with Most Mobile Phones." http://www.amazon.com/Philips-DLP2272-Attachable-Battery-Compatible/dp/B0043RTM28. 7 pgs. Accessed Mar. 21, 2016.
Allputer, "Case-Sticky-on Removable External Battery iPhone 5/iPhone 5s." https://www.allputer.com/index.php?main_page=product_info&cPath=239&products_id=1796. 3 pgs. Accessed Mar. 21, 2016.
Amazon, T5 Premium Quality External Rechargeable Ultra-Slim 2800mah Charger Bumper Case Cover for Apple IPhone 5 5s 5g—Lightweight Detachable Magnetic Emergency Backup Battery Power Bank Power Pack. http://www.amazon.com/gp/product/B00DH1XH8Q?adid=15NM1675HQHWFAE4Q&camp=0&creative=0&creativeASIN=B00DH1XH8Q&linkCode=as4&ref_=as_li_ss_til&tag=hongkiatcom-20. 5 pgs. Accessed Mar. 21, 2016.

* cited by examiner

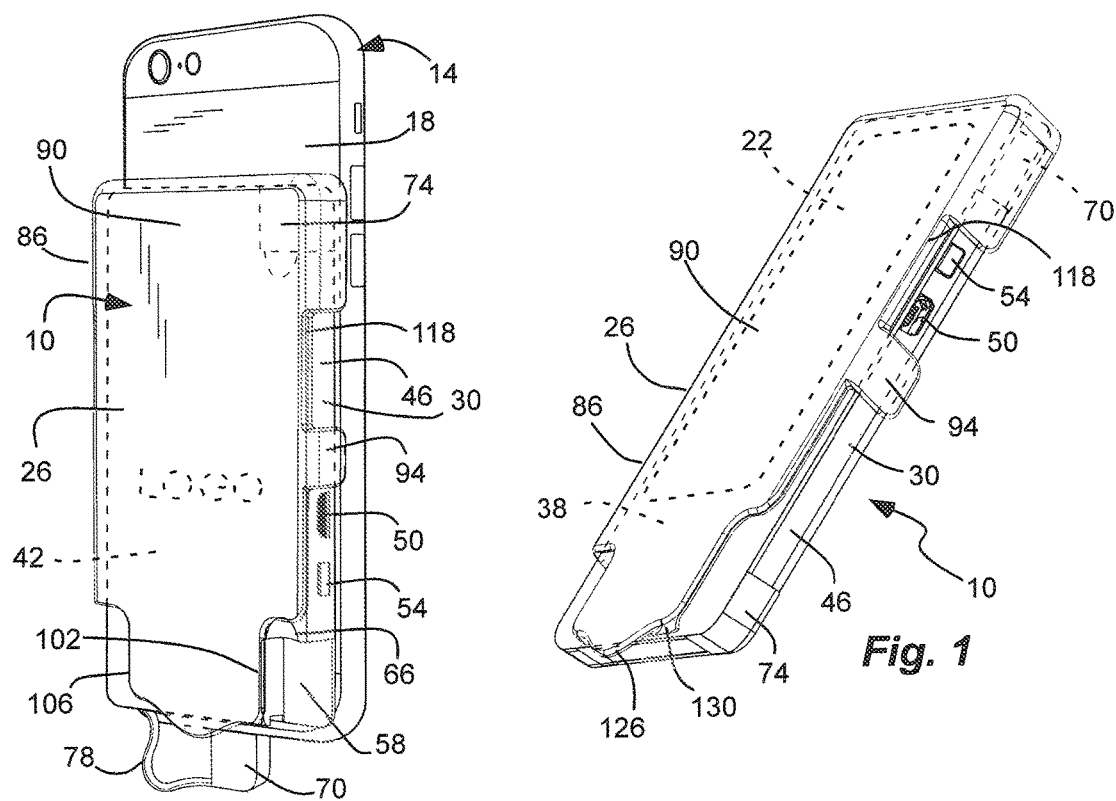
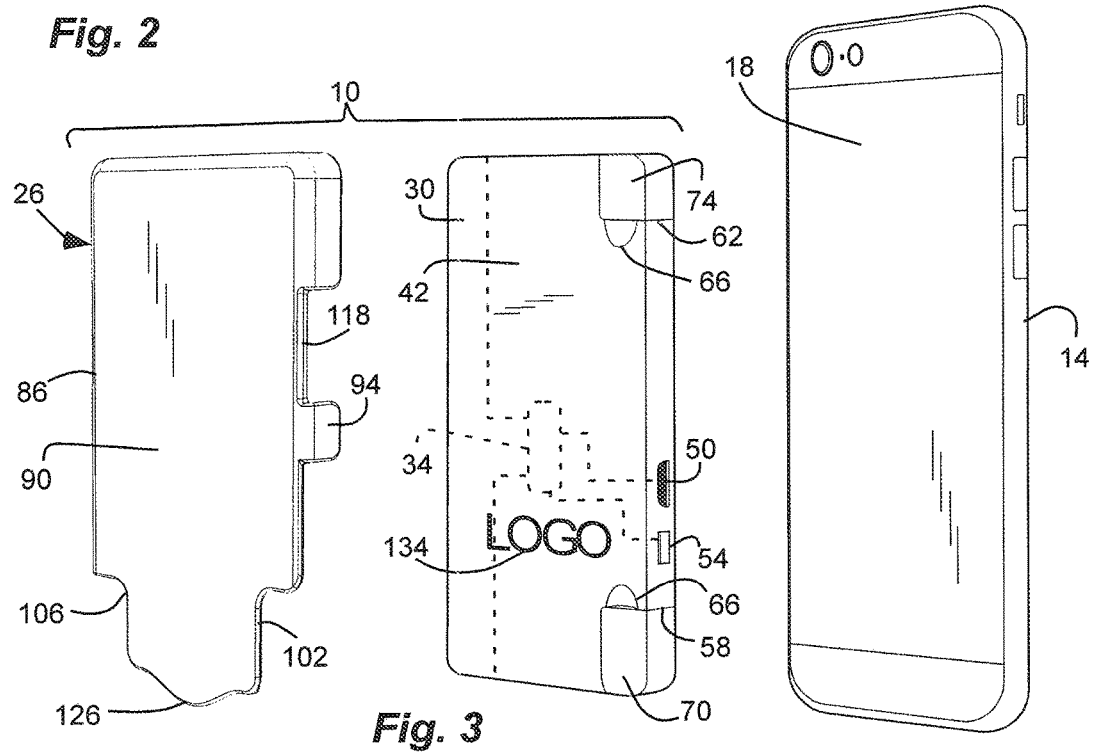
Fig. 1
Fig. 2
Fig. 3

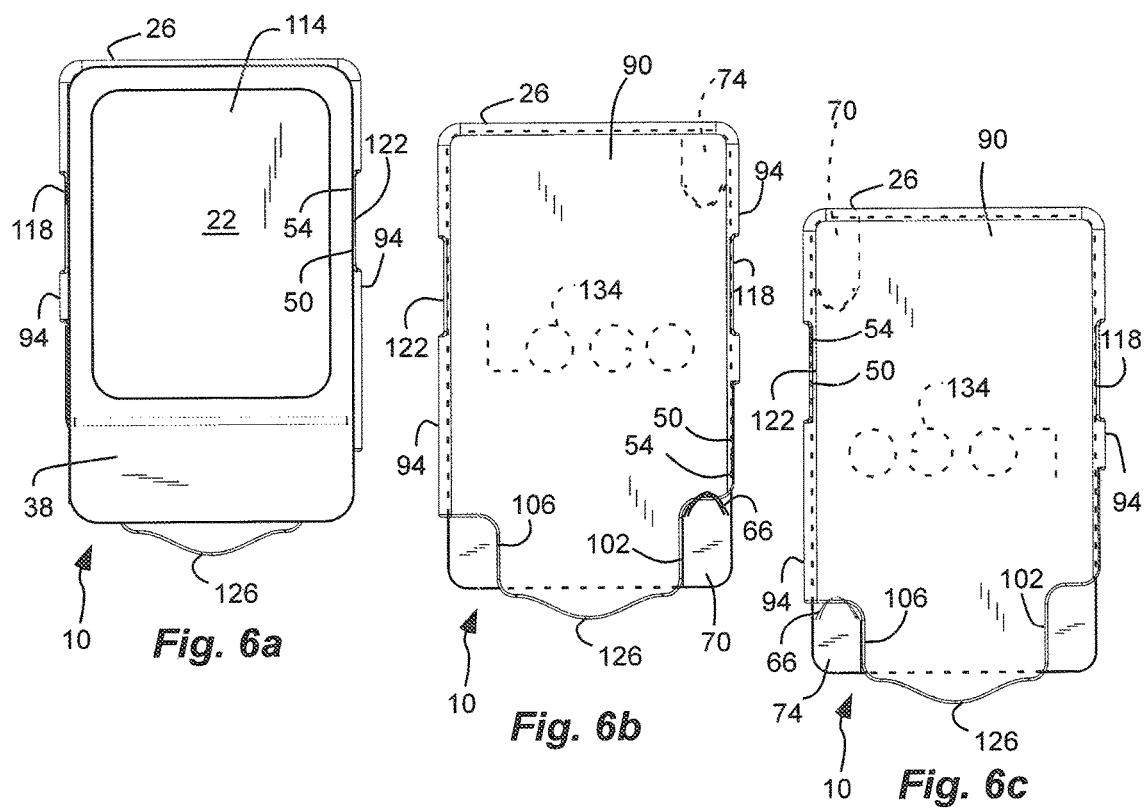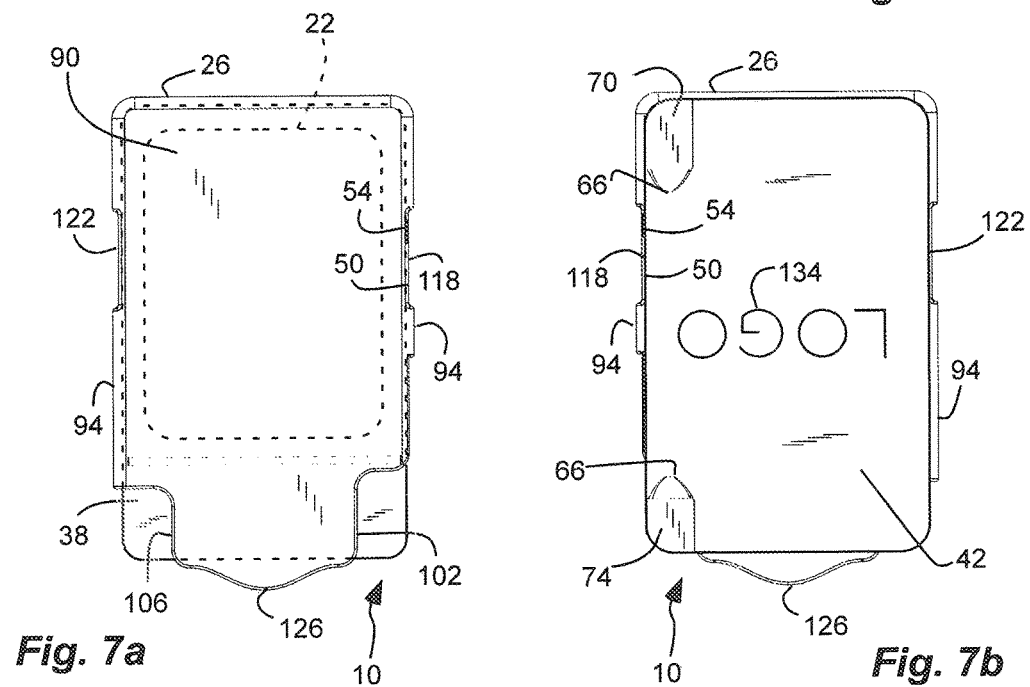

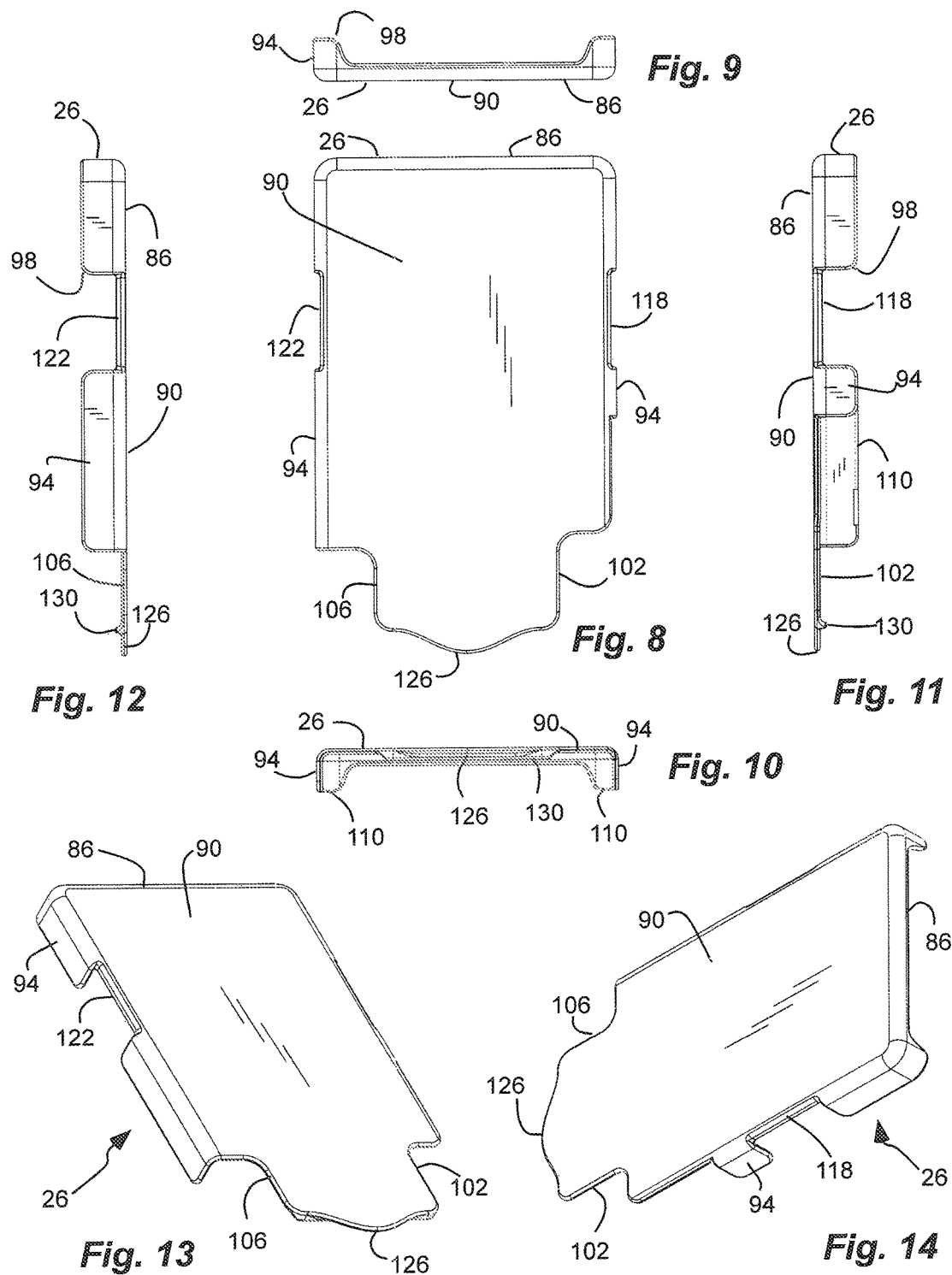

ATTACHABLE SUPPLEMENTAL BATTERY FOR MOBILE DEVICE

PRIORITY CLAIM

Priority is claimed to U.S. Provisional Patent Application Ser. No. 62/340,088, filed May 23, 2016, which is hereby incorporated herein by reference.

BACKGROUND

Field of the Invention

The present invention relates generally to a supplemental battery.

Related Art

As the use of cellular phones increases, one challenge faced by users is battery life. Many users utilize the cellular phone during the day, and charge the cellular phone at night, but deplete the battery of the cellular phone midway through the day. Thus, many users must find a way to recharge the battery. One solution is to plug the cellular phone into a wall outlet, which required users to carry a spare charger. A disadvantage of wall charging is the user can become immobilized during charging. Another solution is the use of a supplemental battery that can be plugged into the cellular phone. One advantage of supplemental batteries is that they are mobile. One disadvantage, however, of supplemental batteries is that they often require the user to juggle two devices interconnected by a cord; which can cause one or the other, or both, to be dropped. Thus, the supplemental batteries can be difficult to handle. Another solution is a battery case that fits over the phone like a protective case, but also provides a supplemental battery. Such battery cases can be bulky. In addition, multiple different battery cases must be manufactured to fit the specific dimensions of a particular phone. Thus, they are not interchangeable.

SUMMARY OF THE INVENTION

It has been recognized that it would be advantageous to develop a supplemental battery for a cellular phone or other mobile device that is easy to handle, and compatible with multiple different cellular phones.

The invention provides a self-attaching supplemental battery for a cellular phone or mobile device, comprising a housing, a releasable attachment pad, and a cover. The housing contains a rechargeable battery, and has opposite sides including an attachment side and a face side. The releasable attachment pad is affixed to the attachment side of the housing, and releasably couples the housing and the rechargeable battery to a back of the cellular phone or mobile device. The cover is removably carried by the housing, and is selectively locatable on either side of the housing. The cover comprises a panel sized and shaped to substantially cover the releasable attachment pad in a protection location when located on the attachment side of the housing, and to expose the releasable attachment pad in a storage location when located on the face side of the housing.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a perspective view of a supplemental battery in accordance with an embodiment of the invention, shown with a cover in a protection location or configuration.

FIG. 2 is a perspective view of the supplemental battery of FIG. 1, shown releasably coupled to a back of a cellular phone;

FIG. 3 is an exploded view of the supplemental battery of FIG. 1 and the cellular phone;

FIG. 6a is a rear view of the supplemental battery of FIG. 1, shown with the cover in a storage location or configuration with a releasable attachment pad exposed.

FIG. 6b is a front view of the supplemental battery of FIG. 1, shown with the cover in the storage location or configuration, and shown with the cover in a first orientation with a first cutout formed in a panel of the cover exposing a first plug in a first pocket.

FIG. 6c is a front view of the supplemental battery of FIG. 1, shown with the cover in the storage location or configuration, and shown with the cover in a second orientation with a second cutout formed in the panel of the cover exposing a second plug in a second pocket.

FIG. 7a is a rear view of the supplemental battery of FIG. 1, shown with the cover in the protection location or configuration.

FIG. 7b is a front view of the supplemental battery of FIG. 1, shown with the cover in the protection location or configuration with a face side of the housing exposed.

FIG. 8 is a front view of the cover of the supplemental battery of FIG. 1.

FIG. 9 is a top view of the cover of the supplemental battery of FIG. 1.

FIG. 10 is a bottom view of the cover of the supplemental battery of FIG. 1.

FIG. 11 is a right side view of the cover of the supplemental battery of FIG. 1.

FIG. 12 is a left side view of the cover of the supplemental battery of FIG. 1.

FIG. 13 is a perspective view of the cover of the supplemental battery of FIG. 1.

FIG. 14 is a perspective view of the cover of the supplemental battery of FIG. 1.

Figure 4:
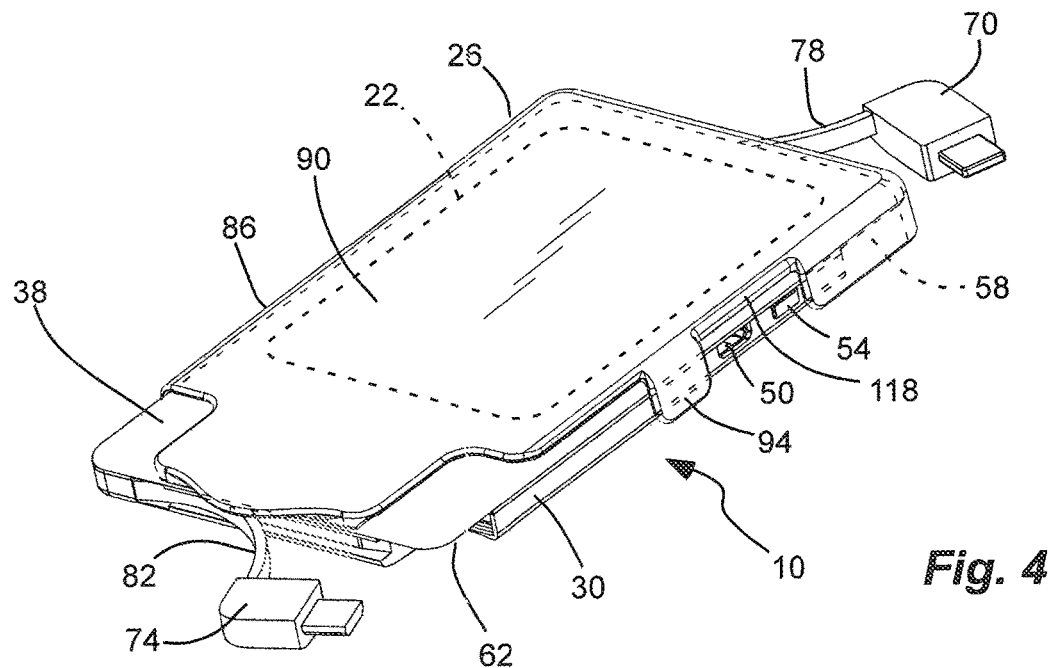
FIG. 4 is a perspective view of the supplemental battery of FIG. 1, shown with a pair of plugs on a pair of cords extending from a housing.
Figure 5:
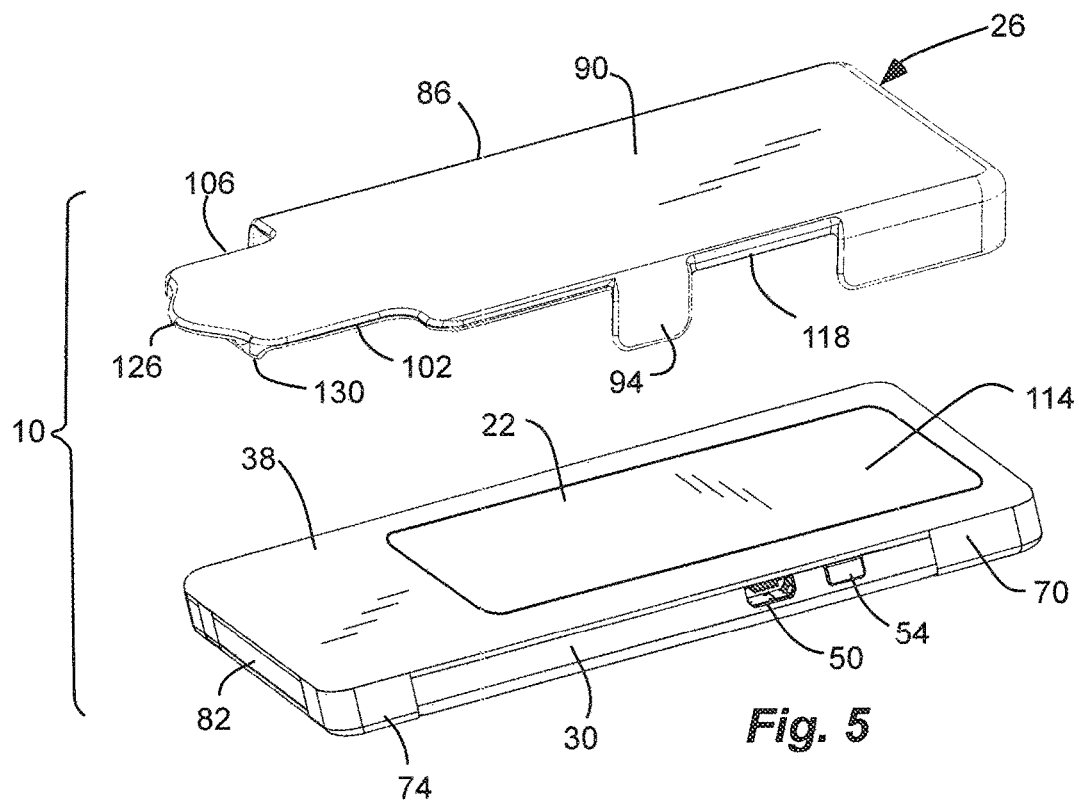
FIG. 5 is an exploded view of the supplemental battery of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "cell phone" and "cellular phone" are used interchangeably herein to refer broadly to a cellular phone, smart phone, phablet, or other handheld electronic device. In addition, the terms "cell phone" or "cellular phone" include any protective or decorative case or skin or film attached to the cellular phone. For example, the phrase "attached to a cellular phone" is intended to mean directly attached to the cellular phone, as well as indirectly attached by way of being attached to a protective or decorative case, skin or film. Such cellular phones can be portable, handheld communication devices that can include a speaker, a microphone, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone.

The term "mobile device" is used broadly herein to refer to a portable, hand-held electronic device, including by way of example, a cellular (cell) phone, a smart phone, a tablet computer or tablet, a phablet, a global positioning system (GPS), a mobile media player, a gaming system, a video monitor, and the like. Such a device can have a display screen upon which data, information, media, etc. is viewed; one or more inputs, such as buttons, a touch screen, etc.; one or more outputs, such as the screen, a speaker, an audio jack, etc.; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. Mobile devices can have various different sizes, including different widths, lengths, or both. The mobile device can be rectangular with a smaller width and a greater height. By way of example, the mobile device can have a width or a height of approximately 55-80 mm.

The term "indicia" is used herein to refer to a visual element(s) that can convey information. The indicia can be embossed or raised, or debossed or lowered, in the material. The indicia can be formed by ink printed on the material or surface. The indicia can be indicative of or representing a business (or company or organization), a product or service, or both, such as a logo, message, slogan, etc. The logo or indicia can be or can include letters, symbols, figures, pictures, logos, art, corporate messages, slogans, bi-lines, icons, etc. that are associated with or that form a representation of a business, company or organization or the like, or a product, service or the like, or both. Thus, the indicia indicative of or representing a business (or company), a product, or both, such as a logo, is presented to the user, and thus becomes a promotion. Thus, the pocket device can be a promotional item and can be provided by businesses, corporations or other organizations, with indicia indicative of or representing a business (or company or organization), a product or service, or both, such as a logo, message, slogan, etc. The pocket devices can be inexpensively manufactured, and in use, can occupy a position of high and frequent visibility. Thus, the pocket devices can be inexpensively manufactured, and given away as promotional items. In addition, the indicia can include instructions or directions for use, orientation, care, warnings, etc. The indicia can include instructions that can be related or unrelated to the use or care of the pocket device. For example, the instructions can include how to use or place the pocket device and/or tether, and how to clean or wash the pocket device and/or tether. As another example, the instructions can relate to the use of something other than the pad itself, such as an item to be disposed thereon or therein.

The terms "interference fit" and "friction fit" are terms of art used interchangeably herein to refer to deliberately causing, increasing and/or using friction to deliberately resist movement. An interference fit or friction fit is different than and greater than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

The term "back of the cellular phone" is intended to include the back of the cellular phone itself as well as any case or skin disposed on the cellular phone.

Description

Referring to FIGS. 1-15, a self-attaching supplemental battery, indicated generally at 10, is shown for providing a supplemental charge for a cellular phone 14 in an exemplary embodiment of the invention. The supplemental battery 10 can be a power bank for charging a battery of the cellular phone 14. The supplemental battery 10 can be temporarily attached to the cellular phone 14, such as to a back 18 of the cellular phone, or case or skin thereof. The supplemental battery can attach with a releasable attachment pad 22, such as a Sticky Pad® type releasable attachment pad. In addition, the supplemental battery 10 can have two built-in charging cables and plugs for different types of styles of cellular phones. For example, the plugs can include: 1) a micro-USB cable for Android-based phones, and 2) a Lightning cable for iPhones. Furthermore, the supplemental battery 10 can have a cover 26. The cover 26 can be a multi-orientation, clear plastic cover that goes over the releasable attachment pad 22, and snap around the edges of the supplemental battery, to keep the releasable attachment pad 22 clean when not in use, and/or resist inadvertent sticking to other objects. The same cover 26 can be snapped on the opposite side of the supplemental battery when the releasable attachment pad 22 is attached to the phone 14 and in use. The cover 26 can be oriented in two different orientations depending, on which cable/plug is being used, to resist loss or misplacement of the cover. In addition, the cover 26 can provide additional thermal insulation when the supplemental battery is in use in case it gets warm while charging the cellular phone 14. The cover 26 can help keep the supplemental battery cooler to the touch.

The supplemental battery 10 has a housing 30 containing a rechargeable battery 34. The housing 30 has opposite, sides including an attachment side 38 to attach to the cellular phone, and a face side 42 opposite the attachment side. The housing can comprise plastic, and can be formed by molding. In addition, the housing 30 can have a perimeter wall 46 extending around the housing and between the attachment side 38 and the face side 42. A charge port 50 and/or a power button 54 can be formed in the perimeter wall 46 of the housing 30 and electrically coupled to the rechargeable battery 34. The housing can also contain control electronics coupled to the battery to control charging and discharging of the battery. Indicator lights can be carried by the housing and electrically coupled to the battery and/or the control electronics to indicate function of the supplemental battery and/or charge level of the rechargeable battery. Furthermore, the housing 30 has first and second pockets 58 and 62. The pockets can be formed on opposite sides of the housing, and are sized and shaped to receive the plugs, described below, substantially flush with the adjacent surfaces of the housing. In one aspect, the pockets can be formed by three continuous walls to receive and/or abut to a body of the plug, with a hole in one wall to receive an electrical protrusion of the plug. In addition, finger indentations 66 can be formed in a surface adjacent the pockets 58 and 62, such as in the face side 42, to facilitate removal of the plugs from the pockets.

As stated above, the supplemental battery 10 and/or the housing 30 has a pair of plugs, for example first and second plugs 70 and 74, electrically coupled to the rechargeable battery 34 by a pair of cords, for example first and second cords 78 and 82, respectively. The first and second plugs can be different from one another. As described above, the first plug 70 is removably received in the first pocket 58 and the second plug 74 is removably received in the second pocket 62. The plugs can be retained in the pockets by friction or interference fit, or snap fit, between the plug bodies and the pockets and/or the electrical extensions and the holes. The plugs or plug bodies can be substantially flush with the surfaces of the housing adjacent to the pockets to resist snagging. The finger indentations 66 can extending into the housing, or the face side 42, to allow a user to engage the plug body with a finger or fingernail and force the plug from the pocket. Similarly, the cords can be retained in channels in the housing. The first cord 78 with the first plug 70 is electrically coupled to the rechargeable battery 34 and can extend from the housing so that the first plug can engage with a corresponding socket of the cellular phone. Similarly, the second cord 82 with the second plug 74, different from the first plug 70, is electrically coupled to the rechargeable battery 34 and can extend from the housing so that the second plug can engage with a corresponding socket of the cellular phone. Thus, the supplemental battery 10 can be configured to be selectively used with multiple different types of cellular phone.

A releasable attachment pad 22 is affixed to the attachment side 38 of the housing 30 to releasably couple the housing, and the rechargeable battery, to the back 18 of the cellular phone 14, or case or skin thereof. The releasable attachment pad 22 can occupy a majority of the attachment side 38 in one aspect; or greater than 75 percent in another aspect. Thus, the releasable attachment pad 22 can provide sufficient surface area to make a strong, yet releasable, attachment to the housing. In one aspect, the releasable attachment pad 22 can be disposed in an indentation in the attachment side of the housing to resist pealing or removal of the releasable attachment pad. In another aspect, the releasable attachment pad 22 can extend beyond an outer surface of the attachment side of the housing, as described below. Initially, the supplemental battery can be provided with a release liner covering the outer, exposed surface of the releasable attachment pad 22.

The attachment pad 22 can be thin and can be permanently assembled to the housing 30 of the supplemental battery 10, allowing the supplemental battery 10 to releasably attach to the back 18 of the cellular phone 14. The attachment pad 22 can comprise: polyurethane, polyurethane foam, PVC foam, acrylic foam, micro-suction foam/tape, or other similar thin releasable sticky materials/tape, with a permanent adhesive on one side, and a releasable stickiness on the other side, or combinations thereof. The attachment pad 22 can be cleaned with water to renew the grip. The supplemental battery 10 can be attached to the cellular phone 14 temporarily, such as only while it is being used to recharge the phone, and then the supplemental battery 10 can be detached from the cellular phone and stored away when not in use, to maintain the slim and sleek design of the phone during most of the phone's use. (As opposed to using a battery "case" on to phone, for example, which is usually a semi-permanent phone case, and makes it bulky.) In one aspect, the attachment pad can comprise a polyurethane layer with a mounting side having a greater surface area than an opposite, outermost surface. In another aspect, the attachment pad can comprise a polyurethane foam layer. In another aspect, the attachment pad can comprise a polyurethane dome.

While the supplemental battery 10 is attached to the phone 14, they become one combined unit, easy to handle and use together in one hand. Many other typical power banks are usually large and shaped like bricks with long cables that are very difficult to handle when connected by charging cable to a phone.

Being able to attach the supplemental battery 10 to the back of any phone via the attachment pad 22, as well as the dual built-in charging cables/plugs (described below), makes the supplemental battery 10 compatible with most phones without regard to size or shape.

The cover 26 is removably carried by the housing 30, and selectively locatable on either side (over or adjacent attachment side 38 and face side 42) thereof. Thus, the cover 26 has two different locations, including: 1) a protection location (FIGS. 1, 4, and 7a), in which the cover 26 and panel thereof is disposed over the attachment side 38 of the housing 30, and the releasable attachment pad 22; and 2) a storage location (FIGS. 2 and 6a-c), in which the cover 26 is disposed over the face side 42 of the housing 30. The cover 26 comprising a shell 86 with a panel 90 sized and shaped to substantially cover the releasable attachment pad 22 in the protection location when located on the attachment side of the housing. In addition, the cover 26 and/or shell 86 has perimeter sides or fingers 94 extending from the panel 90. The panel 90 can be substantially planar and flat, while the perimeter sides or fingers 94 can extend substantially orthogonally or perpendicularly to the panel. An opening 98 (FIGS. 8-12) is defined between the perimeter sides or fingers 94 to receive the housing 30 therethrough, and to expose the releasable attachment pad 22 in the storage location. Thus, the cover 26 and the panel 90 expose tie releasable attachment pad 22 in the storage location when located on the face side 42 of the housing 30. The cover 26 and the panel 90 can have a width spanning a lateral width of the housing 30. In addition, the cover 26 and the panel 90 can cover a majority of the face side 42 or the housing 30 in one aspect; or more than 75 percent in another aspect. The cover 26 can comprise plastic, and can be formed by injection molding.

The cover 26 and the panel 90 can have a pair of cutouts formed in the panel, such as first and second cutouts 102 and 106. The cutouts can be located on opposite lateral sides of the cover or panel. The first cutout 102 is alignable with the first pocket 58 of the housing 30 in a first orientation of the cover in the storage location over the face side 42 of the housing so that the first ping 70 and associated finger indentation 66 is accessible, as shown in FIG. 6b. The second cutout 106 is formed in the panel 90 of the cover 26 opposite the first cutout 102, and is alignable with the second pocket 62 of the housing in a second orientation of the cover in the storage location over the face side 42 of the housing 30, different from the first orientation, so that the second plug 74 and associated finger indentation 66 is accessible, as shown in FIG. 6c.

In addition, the perimeter sides or fingers 94 of the cover 26 or shell 86 extend from the panel 90 on one side of the housing 30 to the other side, such as from the attachment side 38 to the face side 42 in the protection location, or from the face side 42 to the attachment side 38 in the storage location. The perimeter sides or fingers 94 can have lips or hooks 110 (FIGS. 10 and 11) on distal free ends thereof to engaging the other side of the housing 30 opposite the panel 90. The hooks can form a snap-fit of the cover to the housing. The lips or hooks 110 can fit into a chamfer or fillet of an edge of the attachment and/or face sides 38 or 42 so that the distal ends of the perimeter sides or fingers 94 are flush or recessed below a surface of the attachment or face side 38 or 42. The releasable attachment pad 22 having an outermost surface 114 extending beyond the distal free ends of the perimeter sides or fingers 94 of the cover 26. Thus, the outermost surface 114 of the releasable attachment pad 22 is exposed beyond the distal free ends of the perimeter sides or fingers 94 of the cover 30 so that the releasable attachment pad 22 can releasably couple the housing 30 and the rechargeable battery 34 to the back 18 of the cellular phone 14, even when the cover 26 is carried by the housing 30 in the storage location.

In one aspect, the cover 26 and shell 86, and the panel 90 and the perimeter sides or fingers 94, can be sized and shaped to leave a gap between an inner surface of the panel 90 and the outermost surface 114 of the releasable attachment pad 22 in the protection location. The snap-fit of the perimeter sides or fingers 94 with the housing can be the primary connection between the cover and the housing. Thus, the cover can be easier to remove. In another aspect, the inner surface of the panel can releasably couple to the outermost surface of the releasable attachment pad in the protection location.

The plastic cover 26 can snap onto the supplemental battery 10 when not in use, on the attachment side 38, to cover the majority of that side (and the attachment pad 22) of the supplemental battery 10, with hooks 110 around the edge to secure it around the sides of the supplemental battery. The cover 26 helps to keep the attachment pad 22 clean and sticky or tacky, as well as providing more protection to the supplemental battery 10. The cover 26 can be made from many different clear plastic materials, such as polycarbonate, acrylonitrile styrene, PET, etc.

The plastic cover 26 can also snap onto the opposite side (face side 42) of the supplemental battery 10 when the supplemental battery 10 is attached to the phone 14 and in use, so that the cover is not lost or misplaced, and to help protect the supplemental battery. The cover 26 can also provide additional thermal insulation when the supplemental battery 10 is in use in case the supplemental battery 10 gets warm while charging the cellular phone.

In another aspect, the inner surface of the panel 90 of the cover 26 can have a release coating, such as silicone, thereof, or can use a release additive in the plastic, so that the cover releases easily when attached to the attachment side 38 of the supplemental battery 10, even if in contact with the attachment pad 22.

Furthermore, the perimeter sides or fingers 94 of the cover 26 or shell 86 a pair of gaps or notches therein, such as first and second gaps or notches 118 and 122. The first gap or notch 118 in the perimeter sides or fingers 94 can correspond to the charge port 50 and/or the power button 54 of the housing 30 in the protection location of the cover 26, as shown in FIGS. 1 and 4. The opposite second gap or notch 122 in the perimeter sides or fingers 94 of the cover can correspond to the charge port 50 and/or the power button 54 of the housing 30 in the storage location of the cover 26, as shown in FIG. 6c.

The gaps 118 and 122 can be positioned so that they align with the charge port 50 and/or the power button 54 of the housing 30 in three different configurations, including: 1) when attached to the attachment side 38 of the housing 20 in the protection location (when the supplemental battery 10 not in use charging the cell phone); 2) when attached to the face side 42 of the housing 30 in the first orientation of the storage location (when the first plug 70 and first cable 78 are being used to charge the cell phone); and 3) when attached to the face side 42 of the housing 30 in the second orientation of the storage location (when the second plug 74 and the second cable 82 are being used to charge the cell phone). The gaps 118 and 122 allow access to the charge port 50 and/or the power button 54 in each of these configurations, so the power button 54 can be pressed to turn the supplemental battery 10 on, check the charge level status, and/or so the supplemental battery 10 can be charged by the charge port 50 while detached from the phone, and while attached to and charging the phone (pass-through charging). Thus, the cover 26 can be a multi-use, tri-directional snapping cover.

The cover 26 can also have a tab 126 extending a perimeter of the housing 30 when the cover is disposed on the housing. The tab 126 can be engaged by a user to facilitate removal of the cover from the housing. The perimeter sides or fingers 94 can be disposed on three contiguous sides of the panel 90 and cover 26, while a fourth side is open. The tab 126 can extend from the open side. In addition, an alignment bump 130 can extend from the panel at the open side and adjacent the tab 126. The alignment bump 130 can engage a fourth side of the housing 30 while the perimeter sides or fingers 94 can engage the remaining four sides of the housing so that the cover is aligned on the housing and the tab extends past the housing.

In another aspect, the supplemental battery 10 can have indicia 134, indicative of or representing a business, a product, or both, disposed, on the face side 42 of the housing 30. Thus, the indicia 134 can be exposed when the cover 30 is in the protection location, as shown in FIG. 7b. In another aspect, the cover 26 can be transparent or translucent. Thus, the indicia 134 can be visible through the cover 26 when the cover is in the storage location, as shown in FIGS. 2, 6b and 6c. Thus, the supplemental battery 10 can be used as a promotional device.

A method for charging a cellular phone 14, and using the supplemental battery 10 described above, comprises: 1) releasable attaching the supplemental battery 10 to a back 18 of the cellular phone 14 (FIG. 2), or case thereof, with a releasable attachment pad 22 affixed to an attachment side 38 of a housing 33 of the supplemental battery containing a rechargeable battery 34; 2) removably disposing a cover 26 on the housing over a face side 42 of the housing, defining a storage location (FIG. 2); 3) removing a first plug 70 from a first pocket 58 formed in the housing, the first plug being coupled to the rechargeable battery by a first cord 78 (FIG. 4); 4) inserting the first plug 70 into a power port of the cellular phone 14 (FIG. 2); 5) removing the first plug 70 from the power port of the cellular phone 14 after charging the cellular phone; 6) re-inserting the first plug 70 into the first pocket 58 of the housing (FIG. 1); 7) removing the supplemental battery 10 from the back 18 of the cellular phone 14 or case thereof (FIG. 1); 8) removing the cover 26 from the housing 30 (FIG. 5); and 9) removably disposing the cover 26 on the housing 30 over the attachment side 38 of the housing 30 and the releasable attachment pad 22, defining a protection location (FIGS. 7a and 7b).

Removably disposing the cover 26 on the housing 30 over the face side 42 of the housing in the storage location can further comprise: aligning a first cutout 102 formed in a panel 90 of the cover 26 with the first pocket 58 of the housing 30 in a first orientation of the cover in the storage location over the face side of the housing so that the first plug 70 is accessible (FIG. 6b).

The method can further comprise charging another different cell phone, comprising: 1) removing the cover 26 from the attachment side 38 of the housing 30; 2) releasable attaching the supplemental battery 10 to a back of a second cellular phone or case thereof with the releasable attachment pad 22; 3) removably disposing the cover 26 on the housing 30 over the face side 42 of the housing; 4) removing a second plug 74 from a second pocket 62 formed in the housing 30, the second plug 74 being different than the first plug 70 and coupled to the rechargeable battery 34 by a second cord 82; 5) inserting the second plug 74 into a power port of the second cellular phone; 6) removing the second plug 74 from the power port of the second cellular phone after charging the second cellular phone; 7) re-inserting the second plug 74 into the second pocket 62 of the housing; 8) removing the supplemental battery 10 from the back of the second cellular phone or case thereof; 9) removing the cover 26 from the housing 30; and 10) removably disposing the cover 26 on the housing 30 over the attachment side 38 of the housing 30 and the releasable attachment pad 22.

Removably disposing the cover 26 on the housing 30 over the face side 42 of the housing in the storage location can further comprise: aligning a second cutout 106 formed in the panel 90 of the cover 26 with the second pocket 62 of the housing 30 in a second orientation of the cover in the storage location over the face side of the housing, different than the first orientation, so that the second plug 74 is accessible (FIG. 6c).

Figure 15:
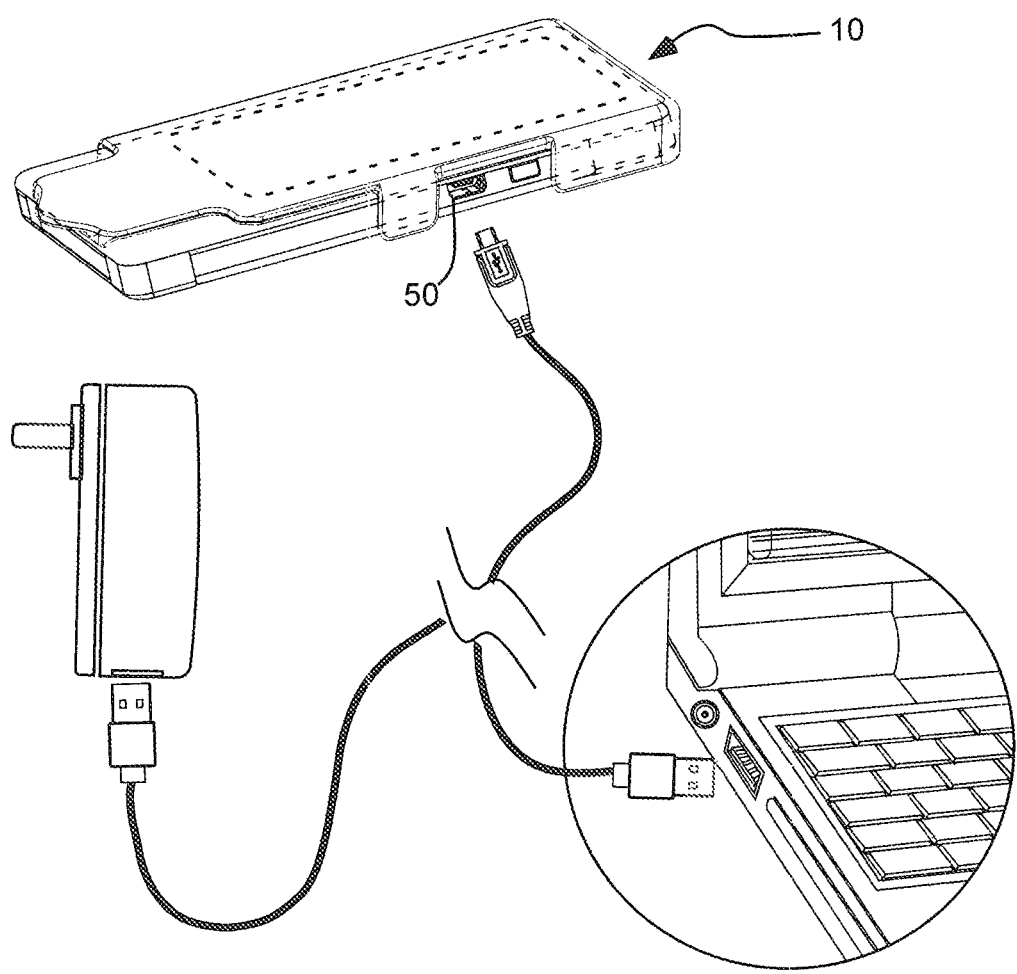
FIG. 15 is a schematic view of the supplemental battery of FIG. 1, shown being charged by a wall charger and/or a laptop computer.

The supplemental battery 10 or rechargeable battery 34 there can be charged using the charge port 50 to connect to a power source, such as a wall adaptor or other electronic device or laptop computer, as shown in FIG. 15.

In one aspect, the attachment pad 22 can be formed of or can include an expanded vinyl material. It has been found that the expanded vinyl material provides a good frictional or "tacky" quality that remains disposed on the housing, and that retains the housing on the cellular phone. In addition, it has been found that such an expanded vinyl material typically can be disposed on the housing or cellular phone without marring or otherwise chemically interfering with the material of the housing or cellular phone. It will be appreciated that many surfaces, such as a back of the cellular phone, can have a finished surface configured to be aesthetically pleasing and luxurious. Such surfaces can be expensive to replace or repair. It has been found that the expanded vinyl material not only provides the required retention of housing on the cellular phone, but also typically does so without chemically interacting with the material of cellular phone, or otherwise damage the surface of the cellular phone.

The expanded vinyl material of the attachment pad forms a temporary, non-chemical, specific or mechanical adhesive bond with the back of the cellular phone (and/or the housing). The attachment pad can be removed from the back of the cellular phone without leaving behind any residue and without damaging the back of the cellular phone. Because the attachment pad is made from expanded vinyl, it can be easily cleaned with soap and water, and still retain its tackiness, and is thus reusable.

The expanded vinyl material more specifically can include: diisodecy/phlthalate; polymeric plasticer; a UV stabilizer; a vinyl hear stabilizer; a blowing agent for vinyl plastisol; and vinyl resin (plastic). The expanded vinyl material can have a weight between approximately 10 and 20 ounces per square yard; more preferably between approximately 12 and 18 ounces per square yard; and most preferably between approximately 14 and 16 ounces per square yard. The frictional holding device 10 can have a thickness between approximately 0.03 and 0.09; more preferably between approximately 0.04 and 0.08 inches; and most preferably between approximately 0.05 and 0.06 inches.

The attachment pad can be formed of different layers with different materials. For example, the pad can have a skin layer formed on the smoother application side formed of a different material than the rest of the pad. For example, the material of the skin layer can include: aqua ammonia ($NH_4OH$); azardine; rubber; color; and body for thickening. The skin layer can have a thickness between 0.003 and 0.006 inches, and more preferably between 0.004 and 0.005 inches.

In another aspect, the attachment pad can be formed of, or can include, a translucent or transparent material. For example, the pad can include a molded polyurethane material. It has been found that the polyurethane material provides both a frictional or "tacky" quality that remains disposed on the back of the phone, and that is transparent or translucent. In addition, the polyurethane material cart be easily cleaned with soap and water.

In another aspect, a polyurethane dome can be affixed to the housing. The polyurethane dome can include or carry indicia. In addition, the polyurethane dome can have tacky properties to removably secure to the back of the phone. The polyurethane dome can be adhered to the housing by an adhesive film. The dome can have a broad, flat shape with an outfacing surface parallel with the housing or outward facing exposed surface, and surrounded by a radius perimeter. A majority, or essentially all, of the outward facing surface can be continuous and smooth and parallel with the slider or the outward facing exposed surface. In addition, the outward facing surface can be flavor substantially flat. Furthermore, the outward facing surface can be surrounded by a radius perimeter. Thus, the perimeter of the outward facing surface curves toward the housing. In one aspect, all of the outward facing surface can be flat and smooth and continuous between the radiused perimeter. Thus, the dome can resist snagging on other objects. The outfacing surface can be tacky, and can cling to the back of the phone by specific or mechanical adhesion. The tackiness of the outward surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 0.85 to 0.95, and about 0.90 in another aspect, so that there is more polyol than catalyst. In another aspect, the ratio of polyol to catalyst can be between 0.63 to 0.85 in one aspect, and between 0.63 to 0.75 in another aspect, so that there is more polyol than catalyst. Typical polyurethane is obtained by mixing polyol and catalyst in a 1:1 ratio. In addition, in one aspect, the outward facing surface or dome can have a hardness between 10 and 35 Shore D. In another aspect, the outward facing surface or dome can have a hardness between 12 and 21 Shore D. In another aspect, the outward facing surface or dome can have a hardness between 12 and 18 Shore D. Other non-tacky stickers or decals typically can have a hardness of 60 Shore D or harder. Furthermore, the outward facing surface can have a coefficient of friction of between 0.3 and 0.1 in accordance with ASTM D 1894.

The polyurethane dome can include an adhesive film adhered to the dome. The adhesive can be selected to provide sufficient adhesion between the polyurethane dome and the housing. The adhesive film can use a chemical adhesive that adheres to the dome and housing. In addition, the adhesive and/or the adhesive film can be substantially transparent, or at least translucent. The adhesive film can be disposed on a substrate. The substrate can also be a film. In one aspect, the substrate can be substantially non-absorbent. The substrate can provide a surface, such as an upper surface opposite the adhesive that can be printable. In addition, the substrate can be substantially transparent, or at least translucent. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can be other films with other characteristics, such as reflective, metal shine, textured, etc. A strength of the adhesive bond between the adhesive film and the slider can be greater than a tacky cling between the outward facing exposed surface and the item(s). Thus, the dome remains on the housing while removed from the back of the phone.

Furthermore, the polyurethane dome can be substantially transparent, or at least translucent. A graphic layer can be disposed behind the dome and visible through the dome. Thus, the graphic layer can be disposed between the housing (or adhesive film) and the dome, or between the substrate and the dome. The graphic layer can include ink disposed on or printed on the substrate. For example, the graphic layer can be an aqueous based inkjet ink. The graphic layer can include the indicia. The graphic layer can include indicia that can be or can include letters, symbols, figures, pictures, logos, art, corporate messages, slogans, bi-lines, icons, etc. that are associated with or that form a representation of a business, company or organization or the like, or a product, service or the like, or both. Furthermore, the graphic layer can be or can include other inclusions, as described in greater detail below. The graphic layer can be visible through the dome. Thus, the dome can protect the indicia. The graphic layer and/or inclusion can be smaller or can have a smaller size than the substrate and dome such that the graphic layer and inclusion are surrounded by a perimeter of the dome and substrate.

As discussed above, the dome or outward facing surface can have a radius perimeter. The dome can be made by pouring the polyurethane material on top of the substrate and graphic layer to form the dome. Thus, the radius perimeter is obtained by individual pouring each dome, without stamping or cutting the domes from a continuous layer. The graphic layer can be printed on the substrate having the adhesive film opposite the graphic layer. The graphic layer can be a discrete graphic contained within the dome, as opposed to a continuous graphic.

As indicated above, the graphic layer can be or can include an inclusion. The inclusions can be embedded in the dome. For example, the graphic layer can be an etched metallic layer. The metallic layer can be etched to form the indicia. Other inclusions can be an LED (or other light source) and a battery power source; a hologram or lenticular artwork; an RFID computer chip or tag; a mirror; one or more gems or faux gems; etc. For example, another dome as described above can have an LED electrically coupled to a battery. The LED may remain continuously activated or lit. Alternatively, the LED may be activated, or the leads for the LED selectively contacted by the battery, such as by pressure applied to the dome. Alternatively, a light sensor can be electrically coupled between the battery and the LED to activate the LED in low light conditions. Other electronics can be included for special effects, such as flashing, etc. It will be appreciated that multiple lights or LEDs of one or more color can be included or embedded in the dome. As another example, another dome as described above can have a gem or faux gem embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material.

In another aspect, the polyurethane layer or dome can be opaque with a graphic layer, such as printing, on the outfacing surface.

In another aspect, the indicia can be printed on or molded into the dome itself, such as on the top or front thereof.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A self-attaching supplemental battery device configured for a mobile device, the supplemental battery device comprising:
   a) a housing containing a rechargeable battery, and having opposite sides including an attachment side and a face side;
   b) a releasable attachment pad affixed to the attachment side of the housing and configured to releasably couple the housing and the rechargeable battery to a back of the mobile device;
   c) a cover removably carried by the housing and selectively locatable on either side thereof;
   d) the cover comprising a panel sized and shaped to substantially cover the releasable attachment pad in a protection location when located on the attachment side of the housing, and exposing the releasable attachment pad in a storage location when located on the face side of the housing opposite the attachment side;
   e) a first cord with a first plug electrically coupled to the rechargeable battery;
   f) a first pocket formed in the housing and removably receiving the first plug; and
   g) a first cutout formed in the panel of the cover and alignable with the first pocket of the housing; and
   h) the first cutout aligning with the first pocket in a first orientation of the cover in the storage location over the face side of the housing so that the first plug is accessible.

2. The supplemental battery device in accordance with claim 1, further comprising:
   a) a second cord with a second plug, different from the first plug, electrically coupled to the rechargeable battery;
   b) a second pocket formed in the housing opposite the first pocket, and removably receiving the second plug; and
   c) a second cutout formed in the panel of the cover opposite the first cutout, and alignable with the second pocket of the housing; and
   d) the second cutout aligning with the second pocket in a second orientation of the cover in the storage location over the face side of the housing, different from the first orientation, so that the second plug is accessible.

3. A self-attaching supplemental battery device configured for a mobile device, the supplemental battery device comprising:
   a) a housing containing a rechargeable battery, and having opposite sides including an attachment side and a face side;
   b) a releasable attachment pad affixed to the attachment side of the housing, and configured to releasably couple the housing and the rechargeable battery to a back of the mobile device;
   c) a cover removably carried by the housing and selectively locatable on either side thereof;
   d) the cover comprising a panel sized and shaped to substantially cover the releasable attachment pad in a protection location when located on the attachment side of the housing, and exposing the releasable attachment pad in a storage location when located on the face side of the housing opposite the attachment side;
   e) perimeter sides or fingers of the cover extending from the panel on one side of the housing to the other side;
   f) hooks on distal free ends of the perimeter sides or fingers of the cover engaging the other side of the housing opposite the panel; and
   g) the releasable attachment pad having an outermost surface extending beyond the distal free ends of the perimeter sides or fingers of the cover, and exposed beyond the distal free ends of the perimeter sides or fingers of the cover, so that the releasable attachment pad is configured to releasably couple the housing and the rechargeable battery to the back of the mobile device with the cover in the storage location.

4. A self-attaching supplemental battery device configured for a mobile device, the supplemental battery device comprising:
   a housing containing a rechargeable battery, and having opposite sides including an attachment side and a face side;
   a releasable attachment pad affixed to the attachment side of the housing, and configured to releasably couple the housing and the rechargeable battery to a back of the mobile device;
   a cover removably carried by the housing and selectively locatable on either side thereof;
   the cover comprising a panel sized and shaped to substantially cover the releasable attachment pad in a protection location when located on the attachment side of the housing, and exposing the releasable attachment pad in a storage location when located on the face side of the housing opposite the attachment side;
   a first gap or notch in perimeter sides or fingers extending from the panel of the cover and corresponding to a charge port and/or a power button of the housing in the protection location of the cover; and
   an opposite second gap or notch in the perimeter sides or fingers of the cover and corresponding to the charge port and/or the power button of the housing in the storage location of the cover.

5. The supplemental battery device in accordance with claim 4, further comprising:
   a tab extending from the cover past a perimeter of the housing when the cover is disposed on the housing, and engagable by a user to remove the cover from the housing.

6. The supplemental battery device in accordance with claim 4, further comprising:
   indicia indicative of or representing a business, a product, or both, disposed on the face side of the housing; and
   the indicia being exposed when the cover is in the protection location.

7. The supplemental battery device in accordance with claim 6, further comprising:
   the cover being transparent or translucent; and
   the indicia being visible through the cover when the cover is in the storage location.

8. The supplemental battery device in accordance with claim 6, further comprising:
   a gap between an inner surface of the panel of the cover and the releasable attachment pad in the protection location.

9. The supplemental battery device in accordance with claim 4, wherein the releasable attachment pad occupies a majority of the attachment side of the housing.

10. The supplemental battery device in accordance with claim 4, further comprising:
    a) an indentation in the attachment side of the housing;
    b) the releasable attachment pad being disposed in the indentation; and
    c) the releasable attachment pad extending beyond the attachment side of the housing.

11. The supplemental battery device in accordance with claim 4, further comprising:
    the releasable attachment pad comprises a tacky polyurethane layer.

12. A self-attaching supplemental battery device configured for a mobile device, the device comprising:
    a) a housing containing a rechargeable battery, and having opposite sides including an attachment side and a face side;
    b) a releasable attachment pad affixed to the attachment side of the housing, the releasable attachment pad being configured to releasably couple the housing and the rechargeable battery to a back of the mobile device;
    c) a cover removably carried by the housing and selectively locatable on either side thereof in two different locations, including:
       i) a protection location in which the cover is disposed over the attachment side of the housing; and
       ii) a storage location in which the cover is disposed over the face side of the housing; and
    d) the cover comprising a shell comprising:
       i) a panel sized and shaped to substantially cover the releasable attachment pad in the protection location;
       ii) perimeter sides or fingers extending from the panel; and
       iii) an opening defined between the perimeter sides or fingers receiving the housing therethrough and exposing the releasable attachment pad in the storage location.

13. The supplemental battery device in accordance with claim 12, further comprising:
    a) the perimeter sides or fingers of the cover extending from the panel on one side of the housing to the other side;
    b) hooks on distal free ends of the perimeter sides or fingers of the cover engaging the other side of the housing opposite the panel; and
    c) the releasable attachment pad having an outermost surface extending beyond the distal free ends of the perimeter sides or fingers of the cover, and exposed beyond the distal free ends of the perimeter sides or fingers of the cover, so that the releasable attachment pad is configured to releasably couple the housing and the rechargeable battery to the back of the mobile device with the cover in the storage location.

14. The supplemental battery device in accordance with claim 12, further comprising:
   a) a first cord with a first plug electrically coupled to the rechargeable battery;
   b) a first pocket formed in the housing and removably receiving the first plug; and
   c) a first cutout formed in the panel of the cover and alignable with the first pocket of the housing;
   d) the first cutout aligning with the first pocket in a first orientation of the cover in the storage location over the face side of the housing so that the first plug is accessible;
   e) a second cord with a second plug, different from the first plug, electrically coupled to the rechargeable battery;
   f) a second pocket formed in the housing opposite the first pocket, and removably receiving the second plug; and
   g) a second cutout formed in the panel of the cover opposite the first cutout, and alignable with the second pocket of the housing; and
   h) the second cutout aligning with the second pocket in a second orientation of the cover in the storage location over the face side of the housing, different from the first orientation, so that the second plug is accessible.

15. A method for charging a cellular phone, the method comprising:
   a) releasable attaching a supplemental battery to a back of the cellular phone or case thereof with a releasable attachment pad affixed to an attachment side of a housing of the supplemental battery, the housing containing a rechargeable battery;
   b) removably disposing a cover on the housing over a face side of the housing, defining a storage location;
   c) removing a first plug from a first pocket formed in the housing, the first plug being coupled to the rechargeable battery by a first cord;
   d) inserting the first plug into a power port of the cellular phone;
   e) removing the first plug from the power port of the cellular phone after charging the cellular phone;
   f) re-inserting the first plug into the first pocket of the housing;
   g) removing the supplemental battery from the back of the cellular phone or case thereof;
   h) removing the cover from the housing; and
   i) removably disposing the cover on the housing over the attachment side of the housing and the releasable attachment pad, defining a protection location.

16. The method in accordance with claim 15, wherein removably disposing the cover on the housing over the face side of the housing in the storage location further comprises:
   aligning a first cutout formed in a panel of the cover with the first pocket of the housing in a first orientation of the cover in the storage location over the face side of the housing so that a first plug is accessible.

17. The method in accordance with claim 15, further comprising:
   a) removing the cover from the attachment side of the housing;
   b) releasable attaching the supplemental battery to a back of a second cellular phone or case thereof with the releasable attachment pad;
   c) removably disposing the cover on the housing over the face side of the housing;
   d) removing a second plug from a second pocked formed in the housing, the second plug being different than the first plug and coupled to the rechargeable battery by a second cord;
   e) inserting the second plug into a power port of the second cellular phone;
   f) removing the second plug from the power port of the second cellular phone after charging the second cellular phone;
   g) re-inserting the second plug into the second pocket of the housing;
   h) removing the supplemental battery from the back of the second cellular phone or case thereof;
   i) removing the cover from the housing; and
   j) removably disposing the cover on the housing over the attachment side of the housing and the releasable attachment pad.

18. The method in accordance with claim 17, wherein removably disposing the cover on the housing over the face side of the housing in the storage location further comprises:
   aligning a second cutout formed in the panel of the cover with the second pocket of the housing in a second orientation of the cover in the storage location over the face side of the housing, different than the first orientation, so that the second plug is accessible.

19. A method for charging a cellular phone, the method comprising:
   a) releasable attaching a supplemental battery to a back of the cellular phone or case thereof with a tacky layer of a releasable attachment pad affixed to an attachment side of a housing of the supplemental battery, the housing containing a rechargeable battery;
   b) charging the cellular phone with the rechargeable battery; and
   c) removing the supplemental battery from the back of the cellular phone or case thereof;
   d) removably disposing a cover on the housing over a face side of the housing, defining a storage location:
   e) removing a first plug from a first pocket formed in the housing, the first plug being coupled to the rechargeable battery by a first cord;
   f) inserting the first plug into a power port of the cellular phone;
   g) removing the first plug from the power port of the cellular phone after charging the cellular phone;
   h) re-inserting the first plug into the first pocket of the housing;
   i) removing the cover from the housing; and
   j) removably disposing the cover on the housing over the attachment side of the housing and the releasable attachment pad, defining a protection location.

* * * * *